Patented Oct. 3, 1944

2,359,443

UNITED STATES PATENT OFFICE 2,359,443

PROCESS OF RECOVERING BIOTIN

Anne Irene Schivek, Pearl River, N. Y., assignor to Lederle Laboratories, Inc., New York, N. Y., a corporation of Delaware No Drawing. Application May 21, 1941,
Serial No. 394,504

5 Claims. (Cl. 167—81)

This invention relates to a process for the recovery of biotin from the waste liquors of fermentation processes for producing organic acids from carbohydrates, and the like, in which various types of molds or fungi are employed in carrying out the fermentation. More particularly the present invention relates to a process for recovering biotin from waste liquors resulting from the production of fumaric acid by molds; to charcoal containing the biotin from such liquors; and to a concentrate containing the biotin from such liquors.

Biotin is a biologically active substance of unknown chemical composition which has heretofore been extracted from hydrolyzed liver cake or from egg yolk, and which has been shown to be useful for curing dermatitis in rats or chickens, is a chicken growth factor, and has also been shown to promote the growth of yeast organisms and various bacteria, such as pneumococcus and staphylococcus, pertussis, and the organism producing gas gangrene.

It has been known in the past that a wide variety of molds or fungi could be used for the production of a great many organic chemical substances, such as acids, alcohols, enzymes, pigments, polysaccharides, sterols, esters, and a number of other miscellaneous substances. Among the more important genera of molds, species of which have been used for the production of organic chemical substances, are the genera Aspergillus, Penicillium, Rhizopus, and Mucor. I have now found that some of these molds may be employed for the production of the substance, biotin, that heretofore was not known to be produced by such methods. I have not definiitely determined which species of molds results in the production of the highest yields of biotin and I do not desire to limit my invention to any particular species. I believe, however, that the molds which are employed commercially for the production of various organic acids are the most important ones since in many instances biotin is produced in appreciable quantities along with the production of the organic acids in such processes.

In accordance with the present invention it has been discovered that biotin is produced in certain fermentation processes and that it can be extracted from the fermentation mixtures by a process to be more fully described hereinafter. One of the preferred fermentation processes, the waste or mother liquors of which may be treated in accordance with the present invention to obtain a biotin concentrate, is the fumaric acid fermentation process. Fumaric acid is produced commercially by several species of molds acting upon a carbohydrate medium containing certain other growth requirements for the molds. For example, in the textbook "Industrial Microbiology" by Samuel Cate Prescott and Cecil Gordon Dumm, first edition, 1940, page 414, the following molds are referred to as molds producing fumaric acid: Aspergillus fumaricus, Circinella sp., Cunninghamella sp., Mucor sp., Mucor stolonifer (Rhizopus nigricans), Penicillium griseofulvum Dierckx, Rhizopus japonicus, Rhizopus niveus, Rhizopus oryzae, Rhizopus pseudochinensis, Rhizopus shanghaiensis, and Rhizopus tritici. In the J. A. C. S. 61, 127 (1939) processes for the production of fumaric acid using molds belonging to the genus Rhizopus are described and a number of suitable nutrient cultural media are also shown.

In carrying out the present invention the waste or mother liquors from the fumaric acid fermentation processes are treated with sufficient activated charcoal to absorb the biotin and the biotin is then recovered from the charcoal by extraction or elution with a suitable medium. Among the various liquids that may be used for eluting the biotin from the charcoal are an aqueous solution of about 60% acetone and 2½% ammonia; or a mixture comrising one part of pyridine, one part of methyl alcohol and four parts of water; or a mixture comprising one part of morpholine, one part of methyl alcohol, and four parts of water.

While the present invention is not limited to the following specific conditions, I have found that when one waste liquor from a commercial process of producing fumaric acid was employed about one part of charcoal for each 100 parts of waste liquor was sufficient to substantially completely adsorb the biotin from the liquid and that the charcoal, after separation from the liquid, upon elution with an aqueous solution containing 60% acetone and 2½% ammonia resulted in a quantitative recovery of biotin from the charcoal. Evaporation of the elution liquid left a slightly colored syrupy residue of a biotin concentrate. In this particular sample of waste liquor about 2,000 gallons was found to contain about one gram of biotin.

The amount of charcoal necessary for adsorbing the biotin will, of course, vary from waste liquor to waste liquor and will also vary somewhat depending upon the grade and kind of charcoal employed. Preferably a high grade of activated decolorizing carbon should be employed for obtaining the best results. It is not necessary to determine beforehand the exact amount of charcoal that should be added and in most cases it is economically desirable to add an excess of charcoal to insure adsorption or absorption of all the biotin since the excess of charcoal employed has very little effect upon the extraction or elution of the biotin therefrom. On the other hand, the possibility of using an excess of charcoal has an important commercial advantage because it permits the charcoal to be added to the waste liquor tanks at the fumaric acid production plants and agitated or allowed to remain in contact therewith a sufficient length of time to insure absorption or adsorption of the biotin. Similarly, the liquor containing the biotin may be filtered through charcoal and the biotin will remain adsorbed thereon. The charcoal containing the biotin can then be separated from the mother liquor by a simple filtration process and shipped to the biotin processing laboratories and hence makes it unnecessary to ship and pay freight on the large volume of waste liquors.

The crude syrupy biotin concentrate produced in the above described process may be further purified by the following method. After the charcoal containing the biotin has been eluted with one of the three organic basic liquids, mentioned heretofore, the elution liquid is evaporated to a syrupy consistency using heat and preferably is carried out under a vacuum. The syrupy residue is taken up in a suitable organic solvent, such as for example, methyl alcohol, and an aluminum silicate, fuller's earth, or similar inert solid substance is added and the solution then evaporated to dryness. This dry residue is extracted with absolute alcohol and upon evaporation of the alcohol a white solid residue containing biotin is obtained. This biotin concentrate is sufficiently pure for biological purposes.

I claim:

1. A process of recovering biotin from the liquors produced in the manufacture of fumaric acid by fermentation which comprises contacting charcoal with the liquor containing biotin, separating the charcoal from the liquor and eluting the biotin from the charcoal, with a basic organic solution, and evaporating the basic organic liquid to obtain a biotin containing concentrate.

2. A process of recovering biotin from the liquors produced in the manufacture of fumaric acid by fermentation which comprises contacting charcoal with the liquor containing biotin, separating the charcoal from the liquor and diluting the biotin from the charcoal, with an organic basic liquid comprising an aqueous solution containing about 60% acetone and about 2½% ammonia and evaporating said liquid to obtain a biotin containing concentrate.

3. A process of recovering biotin from the liquors produced in the manufacture of fumaric acid by fermentation which comprises contacting charcoal with the liquor containing biotin, separating the charcoal from the liquor and eluting the biotin from the charcoal with an organic basic liquid comprising a mixture of about one part of pyridine, about one part of methyl alcohol, and about four parts of water and evaporating said liquid to obtain a biotin containing concentrate.

4. A process of recovering biotin from the liquors produced in the manufacture of fumaric acid by frementation which comprises contacting charcoal with the liquor containing biotin, separating the charcoal from the liquor and eluting the biotin from the charcoal with an organic basic liquid comprising a mixture of about one part of morpholine, about one part of methyl alcohol, and about four parts of water, and evaporating said liquid to obtain a biotin containing concentrate.

5. A process of recovering biotin from the liquors produced in the manufacture of fumaric acid by fermentation which comprises contacting charcoal with the liquor containing biotin, separating the charcoal from the liquor and eluting the biotin from the charcoal with a basic organic solution and evaporating the basic organic liquid to obtain a biotin containing concentrate, dissolving said concentrate in methyl alcohol, adding an aluminum silicate, and evaporating to dryness, extracting the dry residue with absolute ethyl alcohol and evaporating the absolute alcohol to obtain a solid biotin containing concentrate.

ANNE IRENE SCHIVEK.